United States Patent [19]

Paramore et al.

[11] 4,430,787
[45] Feb. 14, 1984

[54] SUCKER RODS WITH IMPROVED COUPLING CAPABILITY AND METHOD

[76] Inventors: Harold W. Paramore, 7617 Fox River Ct., Fort Worth, Tex. 76112; Jacky Burkes, Rte. 4 - Box X-5, Midland, Tex. 79701

[21] Appl. No.: 260,346

[22] Filed: May 4, 1981

[51] Int. Cl.³ ............................................. B22D 19/10
[52] U.S. Cl. ................................ 29/402.11; 29/402.17; 403/343
[58] Field of Search .............................. 403/343, 299; 29/402.06, 402.08, 402.09, 402.11, 402.12, 402.13, 402.17

[56] References Cited

U.S. PATENT DOCUMENTS 2,059,175 10/1936 Myracle .......................... 403/299 X
3,489,445 1/1970 Kammerer, Jr. .................. 403/343
4,003,669 1/1977 Feuske et al. .................. 403/343 X

FOREIGN PATENT DOCUMENTS 127196 4/1948 Australia ............................ 403/299

Primary Examiner—Andrew V. Kundrat
Attorney, Agent, or Firm—Charles D. Gunter, Jr.

[57] ABSTRACT

A sucker rod having improved coupling capability for joining successive lengths of sucker rods in a string has a pin end coupler on one end and a box end coupler on the opposite end. The string is formed by inserting the pin end of one rod directly into the box end of the successive rod without the need of an intermediate cylindrical sleeve. A method of refurbishing the threaded end portions of used sucker rods involves cutting off the old threaded end portions and rethreading the rod ends. An internally threaded pin end coupler is then secured on one end of the rethreaded rod. An internally threaded box end coupler is threadedly secured on the opposite end of the rethreaded rod.

3 Claims, 3 Drawing Figures

U.S. Patent
Feb. 14, 1984
4,430,787
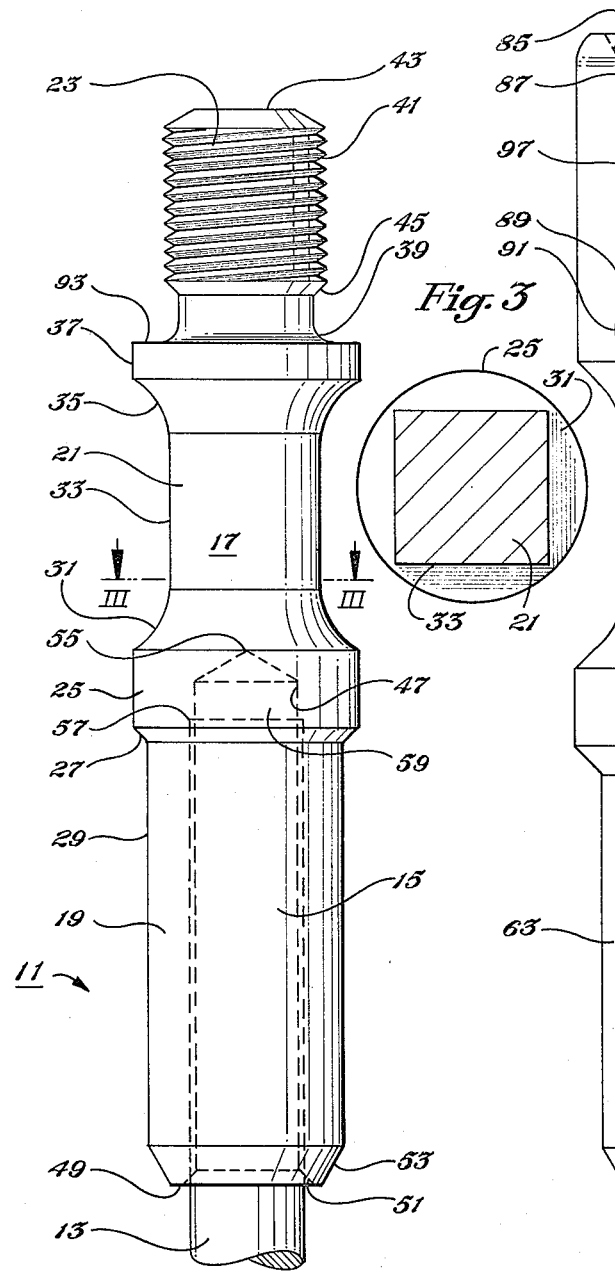
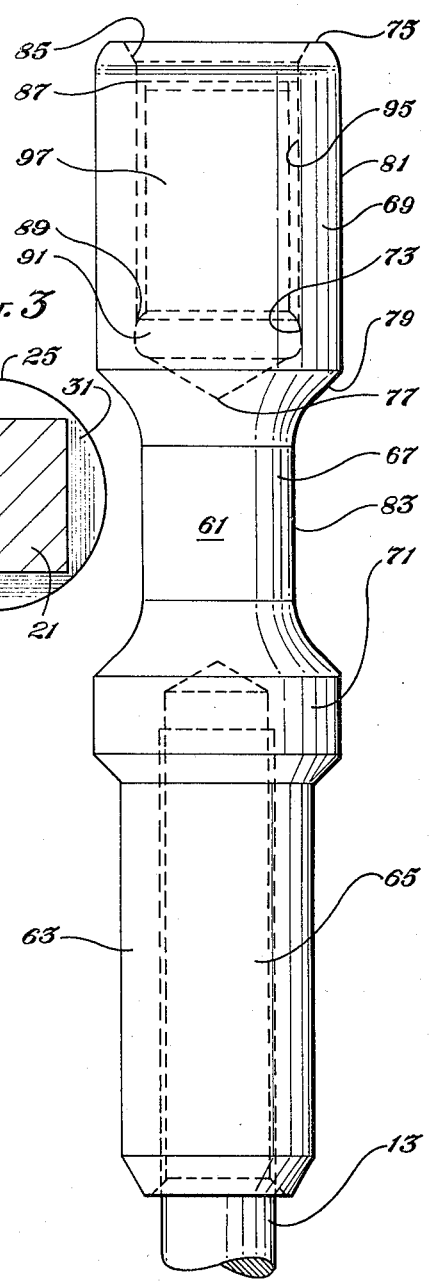

SUCKER RODS WITH IMPROVED COUPLING CAPABILITY AND METHOD

BACKGROUND OF THE INVENTION

The present invention relates generally to oil well sucker rods and particularly to threaded sucker rod couplings which are threadedly secured to one another to form a string of rods and to a method of refurbishing the threaded end portions of used sucker rods.

Oil well sucker rods are threadedly secured to one another to form a string which runs from a pumping jack at the top of the well bore to a reciprocating pump set at a desired location in the well bore. An intermittent loading is placed upon the sucker rods during operation of the well as the rods in the string are loaded upon their upward movement as a result of the pump load and the fluid column above the pump. The weight of the chain of rods and the alternating motion of the pumping operation sets up severe repetitive stresses in the sucker rod chain. As a result, the sucker rod chain is fatigued and premature failure often occurs at the threaded couplings. In the past, the procedure employed has been to inspect the sucker rod chain at approximate six month intervals with the faulty sucker rods being discarded and sold as scrap.

Various types of couplings for sucker rods have previously been suggested to overcome the problem of failure in the threaded connections. U.S. Pat. No. 1,064,764 to Parker, issued June 17, 1913, shows a coupling for use with uniform diameter sucker rods which utilizes a cylindrical sleeve to join successive rods. U.S. Pat. No. 1,538,093 to Dale, issued May 19, 1925, shows a coupling used with a sleeve and having feathered edges which are crimped down in forming the connection. U.S. Pat. No. 2,874,937 to Higgins, issued Feb. 24, 1959, shows a coupling which is attached to a cylindrical fiberglass rod by driving a tapered tool into the end of the rod to expand it. A cylindrical sleeve is used to join the pin ends of successive rods. U.S. Pat. No. 3,489,445 to Kammerer, Jr., issued Jan. 13, 1970, shows a prestressed joint which utilizes an elastomeric washer and which utilizes a cylindrical sleeve to couple the pin ends of successive rods.

In each of these references, the resulting sucker rod joint has a pin end which is joined by means of a cylindrical sleeve to the pin end of the next successive rod. The result is two separate connecting points and, thus, two potential weak spots in the sucker rod chain for each coupling. In addition, although the above references suggest various couplings which are intended to lessen the possibility of failure in the threaded ends, no method is suggested for refurbishing a used sucker rod having damaged threaded ends. Rather, damaged sucker rods have generally been discarded at great expense.

There exists a need, therefore, for a sucker rod having improved coupling capabilities which will reduce the instance of failures in the threaded connections. There also exists a need for a refurbishing method for use on damaged rods which will allow damaged rods to be reused.

SUMMARY OF THE INVENTION

The sucker rod of this invention has improved coupling capability and includes an elongated rod of substantially uniform diameter throughout and having externally threaded ends. A pin end coupler having an internally threaded end portion is secured to one of the externally threaded ends of the elongated rod. The pin end coupler has a polygonal midsection and an externally threaded pin end. A box end coupler having an internally threaded end portion is secured to the externally threaded end of the elongated rod opposite the pin end coupler. The box end coupler has a polygonal mid section and an internally threaded box end. The externally threaded pin end is adapted to be received directly within the internally threaded box end of a successive sucker rod.

In the preferred embodiment, the pin end coupler has a shoulder formed between the polygonal mid section and the externally threaded pin end. The shoulder is adapted to be received on the internally threaded box end of a successive rod. The threads of the internally threaded box end of the successive rod are recessed a selected distance. The external threads of the externally threaded pin end are spaced-apart from the shoulder by approximately the same distance.

The method of refurbishing sucker rods involves first cutting off the threaded end portions of the used rods after which the rod ends are rethreaded. An internally threaded pin end coupler is then secured on a selected end of the rethreaded rod. An internally threaded box end coupler is secured on the opposite end of the rethreaded rod. Preferably, an air displacement adhesive is applied to the rethreaded rod ends prior to securing the couplers. The internally threaded ends of the pin end coupler and box end coupler are heated in the range of 200° to 400° F. and torqued on the ends of the rethreaded rod with a force in the range of 100 to 300 foot-pounds.

Additional objects, features and advantages of the invention will become apparent in the following description.

BRIEF DESCRIPTION OF THE DRAWINGS

FIG. 1 is a side view of a portion of the sucker rod showing the pin end coupler of the sucker rod in place on the externally threaded sucker rod end.

FIG. 2 is a side view of a portion of the sucker rod similar to FIG. 1 showing the box end coupler of the sucker rod in place on the opposite externally threaded end of the sucker rod shown.

FIG. 3 is a cross-sectional view taken along lines III—III in FIG. 1.

DETAILED DESCRIPTION OF THE INVENTION

FIG. 1 shows the pin end of a sucker rod having improved coupling capability designated generally as 11. Sucker rod 11 includes an elongated rod 13 of substantially uniform diameter throughout and having externally threaded ends 15, 65 (shown as dotted lines in FIGS. 1 and 2). Elongated rods 13 are typically of high tensile steel and are ¾ to ⅞ inches in outer diameter. Such rods are provided in standard 25 foot lengths and are used in shallow wells, i.e., those with a maximum depth in the range of about 5,000 to 7,000 feet.

A pin end coupler 17 has an internally threaded end portion 19 secured to a selected externally threaded end 15 of rod 13. Pin end coupler 17 has a polygonal midsection 21 and an externally threaded pin end 23. Internally threaded end portion 19 of pin end coupler 17 is of greater external diameter than the outer diameter of threaded end 15 of elongated rod 13. An external upset 25 is formed in pin end coupler 17 between end portion 19 and mid-section 21, thereby forming a flared surface 27 with respect to outer cylindrical surface 29 of end portion 19.

External upset 25 is generally cylindrical in shape and is of relatively greater external diameter than outer cylindrical surface 29.

A gradually sloping arcuate surface 31 joins external upset 25 to polygonal mid-section 21. Mid-section 21 is preferably square as shown in FIG. 3. The length of each side 33 of a cross section of mid portion 21 is slightly less than the external diameter of outer cylindrical surface 29. The end of mid-section 21 opposite external upset 25 has formed therein a circumferential arcuate surface 35, similar to surface 31, which slopes outwardly from side 33 to form a generally cylindrical shoulder 37. The outer diameter of cylindrical shoulder 37 is preferably approximately equal to the external diameter of external upset 25.

Externally threaded pin end 23 of pin end coupler 17 is joined to shoulder 37 at an arcuate surface 39. Pin end 23 is a solid cylindrically shaped member having external threads 41 beginning at the outer end 43 and running along a portion of the length of pin end 23 in the direction of cylindrical shoulder 37. External threads 41 terminate at a selected point 45 which is spaced-apart from cylindrical shoulder 37.

Internally threaded end portion 19 of pin end coupler 17 has an internal bore 47 which begins at the inner end 49 of coupler 17 opposite outer end 43. Internal bore 47 flares outwardly to form a beveled surface 51 at inner end 49. The external diameter of inner end 49 gradually increases to form a slanted surface 53 between end 49 and outer cylindrical surface 29. The length of internal bore 47 runs from inner end 49 to a point 55 within external upset 25. Internal bore 47 is internally threaded from inner end 49 to a point 57 in the region where flared surface 27 meets external upset 25. This leaves a space 59 in internal bore 47 between threaded end 15 and point 55 when threaded end 15 is secured within threaded end portion 19.

As shown in FIG. 2, the improved sucker rod preferably has a box end coupler 61 having an internally threaded end portion 63 secured to the externally threaded end 65 of elongated rod 13 opposite pin end coupler 17. It should be understood that another pin end coupler identical to coupler 17 can be secured to threaded end 65, however. Coupler 61 is identical to pin end coupler 17 below polygonal mid section 67 but has an internally threaded box end 69 instead of the cylindrical shoulder 37 and pin end 23 of pin end coupler 17. Internally threaded box end 69 is generally cylindrical and has an external diameter approximately equal to that of external upset 71. Box end 69 has an internal bore 73 running from the outer end 75 of box end 69 to a point 77 within that portion of coupler 61 at which arcuate surface 79 connects outer cylindrical surface 81 of box end 69 with polygonal mid section 83. The internal diameter of bore 73 gradually increases at outer end 75 to form a beveled surface 85.

The surface of bore 73 is internally threaded beginning at a point 87 below beveled surface 85 and ending at a point 89 within box end 69 thereby leaving a space 91 below the externally threaded pin end 97 when the pin end 97 of a successive sucker rod is threadedly connected with box end 69. The distance between outer end 75 and point 87 at which the internal threads of bore 73 begin is approximately the same as the distance between the upper surface 93 of cylindrical shoulder 37 of pin end coupler 17 and the point 45 at which the external threads 41 begin on pin end 23. Externally threaded pin end 23 is, thus, adapted to be received directly within the internally threaded box end 69 of a successive sucker rod. Cylindrical shoulder 37 of pin end coupler 17 is adapted to be received on the outer end 75 of internally threaded box end 69. The threads 95 of internally threaded box end 69 are recessed a selected distance with corresponds with the distance at which the external threads 41 of pin end 23 are spaced-apart from cylindrical shoulder 37.

The operation of the improved sucker rod will now be described in detail. The ends 15, 65 of a high tensile steel rod 13 are first externally threaded using an automatic dye head of the type known in the art after being sized to the appropriate length. Sucker rods are generally employed in 25 foot lengths. The length of elongated rod 13 is selected such that when pin end coupler 17 and box end coupler 61 are in place, the overall sucker rod length will be approximately 25 feet. After cleaning the threaded ends 15, 65 to remove any remaining cutting oil, an air displacement adhesive is applied to the threads. The preferred air displacement adhesive is sold by the tradename "LOK-TITE 312" by LOK-TITE Corporation although other suitable air displacement adhesives are available on the market. Elongated rod 13 is then held in a fixed position as with a pneumatic or hydraulic vise. The internally threaded end portion 19 of pin end coupler 17 is then heated in the range of 200° to 400° F. causing end portion 19 to expand slightly. End portion 19 of pin end coupler 17 is then screwed on the externally threaded end 15 of elongated rod 13. Square mid-section 21 of coupler 17 provides a convenient surface for using a pnuematic wrench or the like and pin end coupler 17 is torqued on at 100 to 300 foot-pounds of force.

The internally threaded end portion 63 of box end coupler 61 is then threadedly secured to the externally threaded end 65 of rod 13 opposite end 15 in an identical manner to that previously described.

As shown in FIG. 2, a sucker rod chain is formed by inserting an externally threaded pin end 97 (shown in dotted lines) of one rod 11 directly into the internally threaded box end 69 of a successive adjacent rod. The upper surface 93 of cylindrical shoulder 37 of pin end 23 is received on outer end 75 of box end 69.

The method of refurbishing the threaded end portions of used sucker rods involves first cutting off the threaded end portions of the used rods. The rod ends are then rethreaded and pin end and box end couplers are threadedly secured thereto in the manner previously described.

The improved sucker rod has significant advantages. Successive sucker rods are connected in a string by inserting a pin end of one rod directly into the box end formed in an adjacent rod. The elimination of a cylindrical coupling between adjacent rods adds strength to the string and reduces the possibility of premature failure. The improved design of the pin end and box end couplers produces a stronger sucker rod string which has a greatly improved service life. The method of refurbishing sucker rods solves the problem of discarding used rods with damaged ends. By reusing the old rods, a significant cost savings can be realized.

While the invention has been shown in only one of its forms, it should be apparent to those skilled in the art that it is not thus limited but is susceptible to various changes and modifications without departing from the spirit thereof.

I claim:

1. A method of refurbishing the threaded end portions of used sucker rods, comprising the steps of:
   cutting off the threaded end portions of the used rods;
   rethreading the rod ends;
   securing an internally threaded pin end coupler on a selected end of said rethreaded rod; and
   securing an internally threaded box end coupler on the opposite end of said rethreaded rod.

2. A method of refurbishing the threaded end portions of used sucker rods, comprising the steps of:
   cutting off the threaded end portions of the used rods;
   rethreading the rod ends;
   applying an air displacement adhesive to the rethreaded rod end;
   heating an internally threaded pin end coupler in the range of 200°–400° F.,
   securing the internally threaded pin end coupler on a selected end of said rethreaded rod;
   heating an internally threaded box end coupler in the range of 200°–400° F.; and
   securing the internally threaded box end coupler on the opposite end of said rethreaded rod.

3. The method of claim 2, wherein said pin end coupler and said box end coupler are torqued on said ends of said rethreaded rod with a force in the range of 100 to 300 foot-pounds.

* * * * *